United States Patent
Cannon et al.

(10) Patent No.: US 11,953,580 B2
(45) Date of Patent: Apr. 9, 2024

(54) OVER THE HORIZON RADAR (OTH) SYSTEM AND METHOD

(71) Applicant: THE UNIVERSITY OF BIRMINGHAM, Birmingham (GB)

(72) Inventors: Paul Cannon, Birmingham (GB); Matthew Angling, Birmingham (GB)

(73) Assignee: THE UNIVERSITY OF BIRMINGHAM, Birmingham (GB)

(*) Notice: Subject to any disclaimer, the term of this patent is extended or adjusted under 35 U.S.C. 154(b) by 62 days.

(21) Appl. No.: 17/255,281

(22) PCT Filed: Jun. 28, 2019

(86) PCT No.: PCT/GB2019/051836
§ 371 (c)(1),
(2) Date: Dec. 22, 2020

(87) PCT Pub. No.: WO2020/002937
PCT Pub. Date: Jan. 2, 2020

(65) Prior Publication Data
US 2021/0132208 A1    May 6, 2021

(30) Foreign Application Priority Data

Jun. 29, 2018  (GB) .................................. 1810748

(51) Int. Cl.
*G01S 13/02* (2006.01)
*G01S 7/40* (2006.01)
(Continued)

(52) U.S. Cl.
CPC .......... *G01S 13/0218* (2013.01); *G01S 7/40* (2013.01); *G01S 13/003* (2013.01); *G01S 13/917* (2019.05); *G01S 2013/0227* (2013.01)

(58) Field of Classification Search
CPC ...... G01S 13/0218; G01S 13/917; G01S 7/40; G01S 13/003; G01S 2013/0227; G01S 13/584
See application file for complete search history.

(56) References Cited

U.S. PATENT DOCUMENTS 5,952,982 A * 9/1999 Jorgenson .............. H01Q 11/10
343/797
9,423,495 B1 * 8/2016 Chang ................. G01S 13/0218
(Continued)

FOREIGN PATENT DOCUMENTS

CN       104267389 A    1/2015
GB         2257323 A    1/1993
(Continued)

OTHER PUBLICATIONS

Fridman, Sergey V., L. J. Nickisch, and Mark Hausman. "Inversion of backscatter ionograms and TEC data for over-the-horizon radar." Radio Science 47, No. 04 (2012): 1-8. (Year: 2012).*
(Continued)

*Primary Examiner* — Olumide Ajibade Akonai
*Assistant Examiner* — Yonghong Li
(74) *Attorney, Agent, or Firm* — Thompson Hine LLP

(57) ABSTRACT

A method for implementing a relocatable Over-The-Horizon-Radar (OTHR) including transmitting mutually orthogonal signals on each of a plurality of antenna elements of a transmitting system, and receiving and decoding the signals at a plurality of receiving systems to synthesize beams from the orthogonal signals. Each receiving system has a plurality of antenna elements fewer in number than the plurality of antenna elements of said transmitting system. The method includes connecting as a network the transmitting system, the plurality of receiving systems, and a network controller.

13 Claims, 6 Drawing Sheets

(51) Int. Cl.
*G01S 13/00* (2006.01)
*G01S 13/91* (2006.01)

(56) References Cited

U.S. PATENT DOCUMENTS 9,933,520 B1\* 4/2018 Campbell ............... G01S 13/42
2010/0156703 A1 6/2010 Cannon
2018/0196132 A1 7/2018 Xu et al.

FOREIGN PATENT DOCUMENTS

WO 2006/075992 A2 7/2006
WO 2017/041402 A1 3/2017

OTHER PUBLICATIONS

G. J. Frazer, "Experimental results for MIMO methods applied in over-the-horizon radar," in IEEE Aerospace and Electronic Systems Magazine, vol. 32, No. 12, pp. 52-69, Dec. 2017, doi: 10.1109/MAES.2017.170057. (Year: 2017).\*

United Kingdom Intellectual Property Office, Search Report, Application No. GB1810748.2, 2 pages (dated Dec. 19, 2018).

European Patent Office (ISA/EP), International Search Report, International Application No. PCT/GB2019/051836, 4 pages (dated Sep. 13, 2019).

European Patent Office (ISA/EP), Written Opinion of the International Searching Authority, International Application No. PCT/GB2019/051836, 9 pages (dated Sep. 13, 2019).

Abramovich, Y.I. et al., "Principles of Mode-Selective MIMO OTHR," IEEE Transactions on Aerospace and Electronic Systems, vol. 49, No. 3, pp. 1839-1868 (2013).

Elvidge, S. et al., "Using the local ensemble Transform Kalman Filter for upper atmospheric modelling," Journal of Space Weather and Space Climate, 9, A30, 12 pages (2019).

Frazer, G.J. et al., "Initial Results From An Experimental Skew-Fire Mode-Selective Over-The-Horizon-Radar," presented at the IEEE National Radar Conference, Cincinnati, OH, 4 pages (2014).

Frazer, G.J. et al., "Multiple-input multiple-output over-the-horizon radar: experimental results," IET Radar Sonar Navigation, vol. 3, Issue 4, pp. 290-303 (2009).

Penney, R.W. et al., "Mitigating satellite motion in GPS monitoring of traveling ionospheric disturbances," Radio Science, 50, pp. 1150-1164 (2015).

Reinisch, B. et al., "Pilot Ionosonde Network for Identification of Traveling Ionospheric Disturbances," Radio Science, 53, pp. 365-378 (2018).

\* cited by examiner

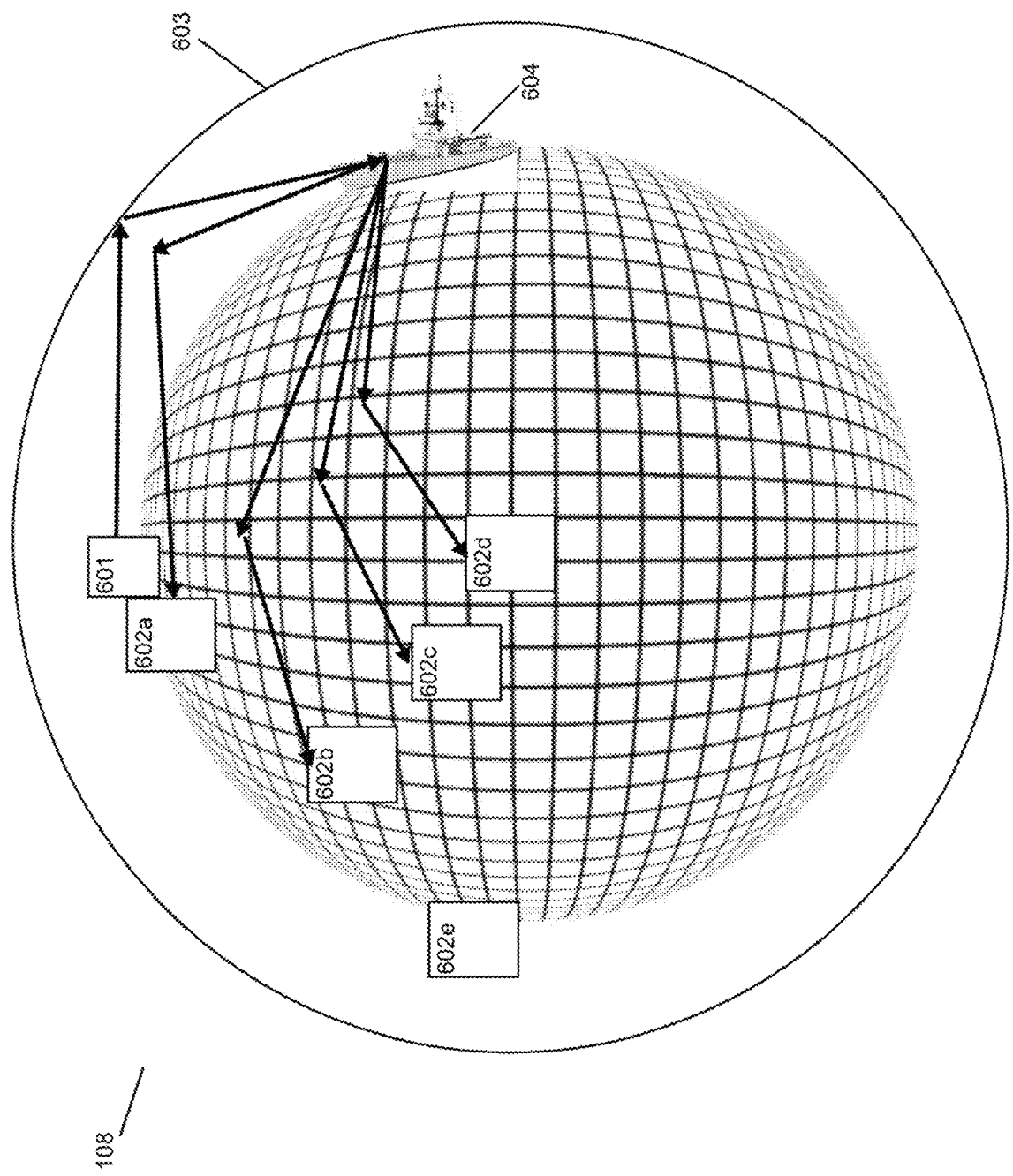

OVER THE HORIZON RADAR (OTH) SYSTEM AND METHOD

CROSS-REFERENCE TO RELATED APPLICATIONS

This application is a national stage filing of PCT International Application No. PCT/GB2019/051836 filed on Jun. 28, 2019 (corresponding to International Publication No. WO 2020/002937), which in turn claims priority to Great Britain Application No. GB1810748.2 filed on Jun. 29, 2018. The entire contents of both of these applications are incorporated by reference herein.

TECHNICAL FIELD

The invention relates to an over-the-horizon radar (OTHR) system and method, and can incorporate High Frequency (HF) Over the Horizon Radar (OTHR) and Line of Sight (LOS) Radar.

BACKGROUND

Over the Horizon Radar (OTHR) can provide wide-area, persistent surveillance of aircraft and other manmade targets. It can also be used to monitor sea-state and sea-ice. Typical operational ranges lie between 500 km and 3000 km (i.e. beyond line of sight, (BLOS)) but these ranges can be more or less. OTHR operates by reflecting signals in the high frequency (HF, 3-30 MHz) band off the ionosphere at altitudes of around 300 km to provide a BLOS capability. Conventional OTHR uses large transmitter antenna arrays (typically 100-200 metres long) and even larger receiver antenna arrays, extending to many kilometres. The arrays each comprise many antenna elements. The transmitting and receiving systems are usually located 50 km to 100 km from each other to provide radio frequency (RF) isolation of the transmitter from the receiver. Although an OTHR is formally bistatic it can often be considered monostatic at typical detect and track ranges; consequently, a conventional OTHR transmitter and receiver can only measure the line-of-sight speed of a target. Line-of-sight speed refers to the component of the target's speed towards or away from the observer. Bistatic radar is the name sometimes given to a radar system comprising a transmitter and receiver that are separated by a distance. Conversely, a radar in which the transmitter and receiver are collocated is sometimes called a monostatic radar. A multistatic radar system contains multiple spatially diverse monostatic radar or bistatic radar components with a shared area of coverage.

Successful OTHR detection and tracking is dependent on an adequate signal-to-noise plus clutter ratio at the Doppler frequency corresponding to the line of sight speed of a target. Low frequency clutter due to travelling ionospheric disturbances (TIDs) and sea waves obscures slow-moving targets, such as ships, but not fast-moving targets such as aircraft and missiles. This low frequency clutter severely limits the performance of conventional OTHR when detecting and tracking small, slow ships. Faster (i.e. higher Doppler) auroral and equatorial clutter has a broader impact.

Frazer, G. J., Y. I. Abramovich, and B. A. Johnson (2009), Multiple-input multiple-output over-the-horizon radar: experimental results, IET Journal of Radar, Sonar and Navigation, 3(4), 290-293-293, doi: doi:10.1049/iet-rsn.2008.014, describes the results from an experiment applying one class of multiple-input multiple-output (MIMO) waveform techniques to OTHR to demonstrate that adaptive transmitter beamforming could be used in an appropriately designed radar to reject spatially discrete Doppler-spread clutter.

Frazer, G. J., A. J. Heitmann, and Y. I. Abramovich (2014), Initial results from an experimental skew-fire Mode-Selective over-the-horizon-radar, paper presented at IEEE Radar Conference, IEEE, Cincinnati, Ohio, USA, highlights that the use of skywave over-the-horizon radar for the detection and tracking of ships is significantly more challenging than the equivalent task for aircraft. The paper describes initial results for a proposed class of radar called mode-selective OTHR that is able to selectively isolate each of the multiple ionospheric paths between the radar and surveillance region.

Elvidge, S and M. J. Angling (2019), Using a Local Ensemble Transform Kalman Filter for Upper Atmospheric Modelling, Journal of Space Weather and Space Climate [accepted] describes an Advanced Ensemble electron density (Ne) Assimilation System (AENeAS) which is a data assimilation model of the ionosphere/thermosphere. An outline of the local ensemble transform Kalman filter (LETKF) is provided with equations presented in a form analogous to the classic Kalman filter. An enhancement to the efficient LETKF implementation to reduce computational cost is also described. The paper presents the results of a benchmark test for the model which shows that AENeAS exhibits a total electron content (TEC) RMS error of 2 TECU compared with 7.9 TECU for the International Reference Ionosphere (IRI) and 14.5 for TIE-GCM.

Reinisch, B., Galkin, I., Belehaki, A., et al. (2018), Pilot Ionosonde Network for Identification of Travelling Ionospheric Disturbances, Radio Science, 53, 365-378 proposes a technique of measuring TID characteristics in real time based on an analysis of oblique digisonde-to-digisonde skymap observations, to directly identify TIDs and specify the TID wave parameters based on the measurement of angle of arrival, Doppler frequency, and time of flight of ionospherically reflected high-frequency radio pulses.

Penney, R. W., and N. K. Jackson-Booth (2015), Mitigating Satellite Motion in GPS Monitoring of Traveling Ionospheric Disturbances, Radio Science, 50, 1150-1164, proposes techniques for cross-correlating TID waveforms while taking account of Doppler shifts created by satellite motion.

There may be a need for an improved OTHR which is capable of overcoming the above described limitations.

SUMMARY

In one embodiment the invention provides an over-the-horizon radar (OTHR) system and a method of detecting the position and velocity of a target beyond the horizon, as set out in the accompanying claims.

Exemplary embodiments of the invention will now be described, by way of example only, with reference to the accompanying drawings.

BRIEF DESCRIPTION OF THE DRAWINGS

FIG. 6 shows a representation of the networked over the horizon radar system of FIG. 1.

DETAILED DESCRIPTION

Figure 1:
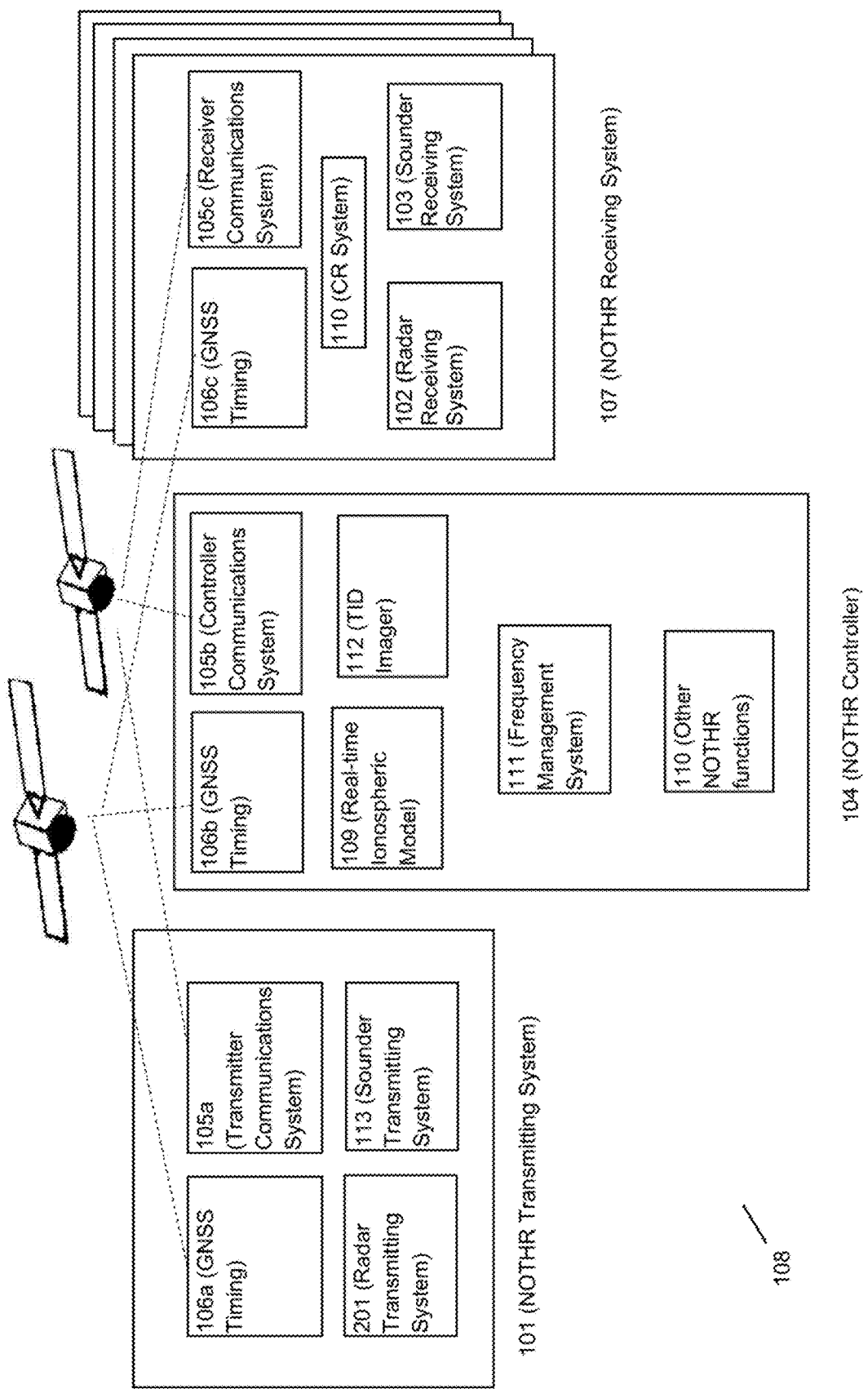
FIG. 1 shows a representation of a networked over the horizon radar system according to an embodiment of the invention.

FIG. 1 shows a representation of a networked OTHR (NOTHR) system 108 according to an embodiment of the invention comprising a NOTHR transmitting system 101, a NOTHR controller 104, and a NOTHR receiving system 107. The NOTHR receiving system 107 will comprise a plurality of distinct stations, each having the same hardware infrastructure.

The NOTHR transmitting system 101 comprises one or more radar transmitting systems 201, also described as a transmitter, and a sounder transmitting system 113.

The NOTHR controller 104 comprises a frequency management system (FMS) 111, an ionospheric model 109 (which will be a real-time ionospheric model), and a travelling ionospheric disturbance (TID) imager 112, which may use the ionospheric model 109 to generate travelling ionospheric disturbance images to include as part of an ionospheric model output. The NOTHR controller may also perform a number of other NOTHR functions such as waveform selection, radar track fusing from several receivers, track displays and command and control functions.

The NOTHR receiving system 107 comprises one or more distinct systems, each having a radar receiving system 102 (which may be land or sea based), a coordinate registration (CR) system 110, and a sounder receiving system 103. When the radar receiving systems 102 of multiple NOTHR receiving system stations are discussed, they are referred to herein as a plurality of receivers.

The NOTHR transmitting system 101, NOTHR controller 104 and NOTHR receiving system 107 are linked by a communications system 105a-c comprising a transmitter communications system 105a, a controller communications system 105b, and a receiver communications system 105c, which in this example is assumed to use a satellite bearer (i.e. satellite communications, SATCOM). Each is also assumed to have an embedded timing and synchronization system 106a-c, which in this example is via a Global Navigation Satellite System (GNSS). The communications system 105a-c enables the networking together of the NOTHR transmitting, receiving and controller systems 101, 107, 104. It is envisaged that the NOTHR controller 104 may be configured to, using the communications system 105a-c, communicate an ionospheric model output, frequency management instructions, and travelling ionospheric images to a plurality of receiving stations of the NOTHR receiving system 107, and frequency management instructions to one or more transmitting stations of the NOTHR transmitting system 101.

It is envisaged that the system will be used at mid-latitudes but in some embodiments it may be adapted to accommodate auroral and equatorial backscatter, for example by beamforming to select particular propagation modes.

In operation, the NOTHR transmitting system 101 using the radar transmitting system 201 generates and transmits radar signals that propagate up to the ionosphere where they are refracted back down towards the ground where they illuminate the target area. The footprint of this illumination is typically several hundred kilometres by several hundred kilometres in area. The signals bounce off objects within this footprint and return via the ionosphere to the one or more radar receiving systems 102 of the NOTHR receiving system 107.

As described above, the embodiments described herein differ from conventional OTHR systems in that they comprise a networked monostatic and bistatic OTHR (NOTHR) system 108 designed to detect and track small ships and which can determine the target velocity (as opposed to only the line-of-sight speed) from the target's Doppler shift. The NOTHR system 108 can also be used to detect and track aircraft, missiles and other targets.

Figure 2:
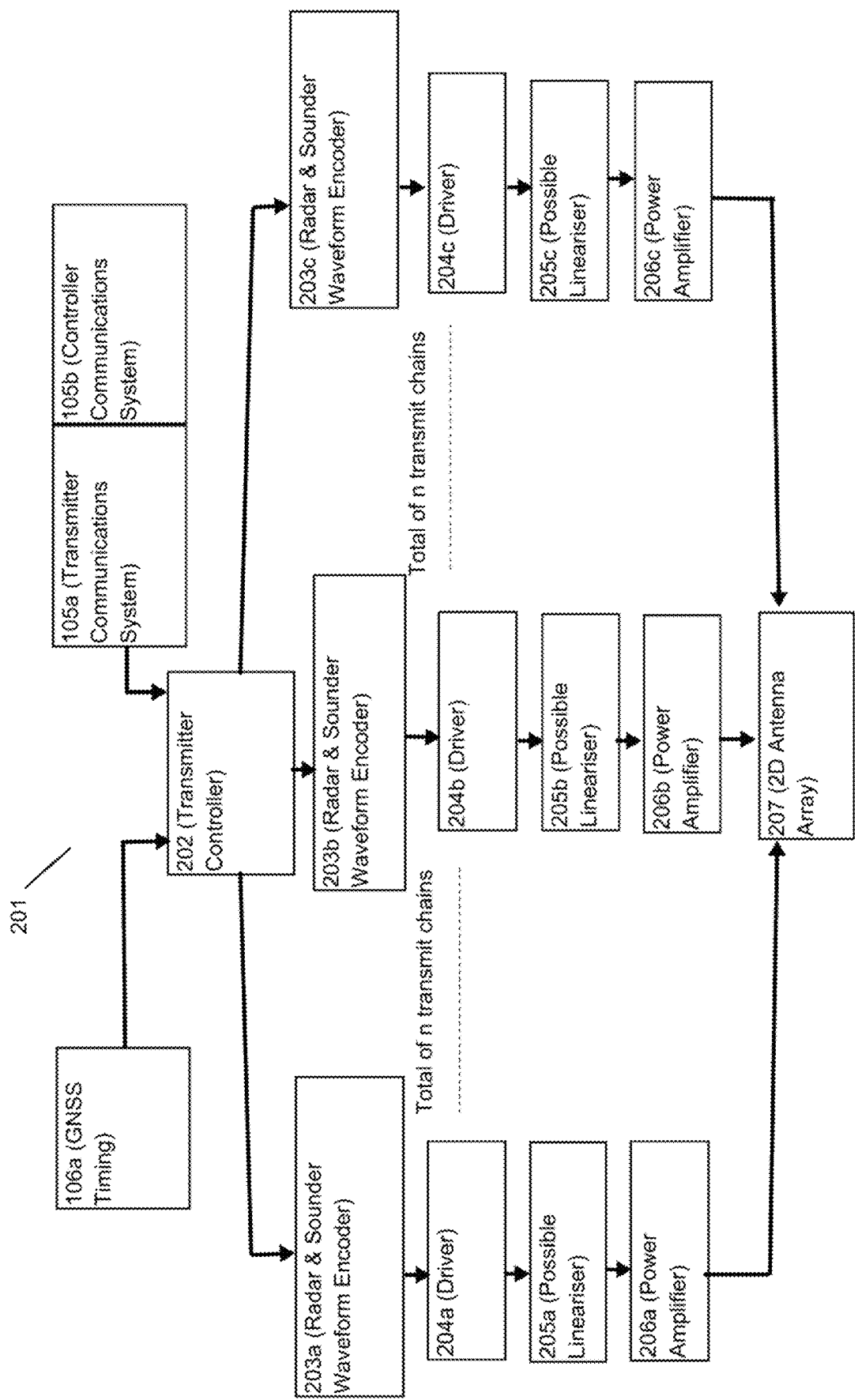
FIG. 2 shows a representation of a radar transmitting system according to an embodiment of the invention.

FIG. 2 shows a representation of a radar transmitting system 201 according to an embodiment of the invention and which can be used in the NOTHR transmitting system 101 as part of the system of FIG. 1.

The radar transmitting system 201 comprises a transmitter controller 202, a number "n" of transmit chains, and a 2D transmitter antenna array 207. The signals from each of the 'n' transmitter chains will be orthogonal. FIG. 2 shows three chains, each comprising a radar and sounder waveform encoder 203a-c, a driver 204a-c, a possible (i.e. optional) linearizer 205a-c, and a power amplifier 206a-c. The number "n" of transmit chains used depends on the intended performance characteristics of the system being designed. The radar and sounder waveform encoders 203a-c enable the receiving systems 107 to adaptively synthesize beams from the signal transmitted by the 2D array.

The 2D antenna array 207, typically consisting of hundreds of elements, could consist of biconical antennas each fed from a power amplifier running several kilowatts of output power. As described above, orthogonal waveforms are transmitted from each antenna element in the array to enable the signals to be distinguished. As will be described in more detail below, the transmission of mutually orthogonal signals by the NOTHR transmitting system 101 provides the ability to perform beamforming at the receiving stations of the NOTHR receiving system 107. The radar transmitting system 201 is subject to a common control and management system, such as the NOTHR controller 104, which can control and manage the radar transmitting system 201 via the controller communications system 105b and transmitter communications system 105a. All transmitter chains are locked to a common timing reference 106a which may be GNSS derived.

Figure 3:
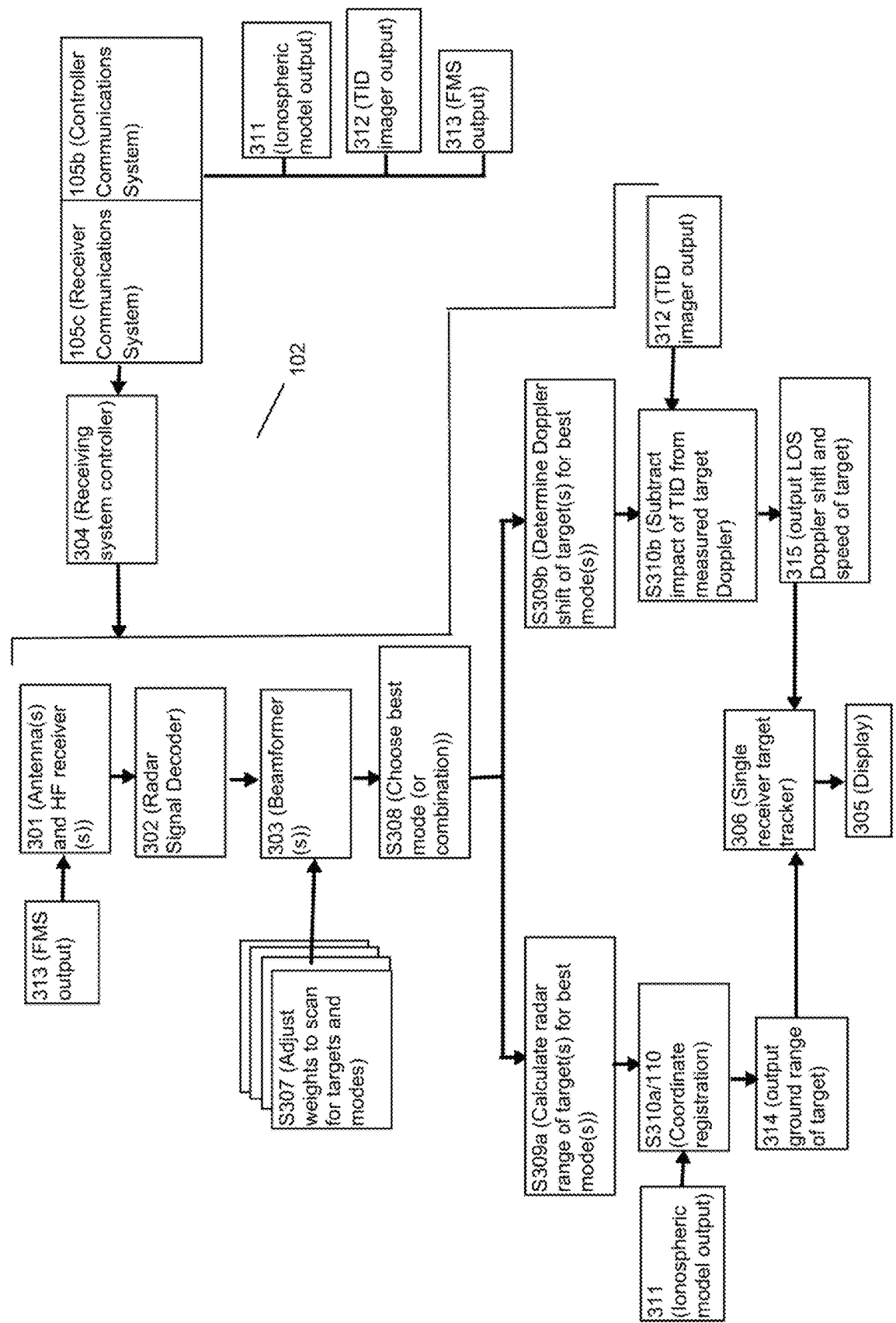
FIG. 3 shows a representation of a radar receiving system according to an embodiment of the invention.

FIG. 3 shows a representation of a radar receiving system 102 according to an embodiment of the invention and which can be used in the NOTHR receiving system 107 as part of the system of FIG. 1.

The radar receiving system 102 comprises a receiver which may comprise one or a small number of antenna elements 301 (such as two to ten), a radar signal decoder 302 (also referred to as a radar correlator), one or more beamformers 303, a receiving system controller 304, a display 305, and a single receiver target tracker 306.

It is envisaged that the fewer number of antenna elements used, the greater the advantage is of providing a cheap and easily deployable system, thus making the bistatic networked configuration realizable. Thus, a two antenna element system will be cheaper and more easily deployable than a ten antenna element system, which in turn will be significantly cheaper and more easily deployable than traditional OTHR systems which use many more antenna elements. Above ten antenna elements, the system may no longer be seen as cheap and easily deployable.

If more than one antenna is used, these can be configured to provide some directivity which will beneficially exclude interfering signals or it may be used adaptively.

The antenna(s) 301 receive a signal which is passed to the radar signal decoder 302. The received signal is a composite signal made up of distinct signals from each of the antenna elements in the transmitter array 207. The radar signal decoder 302 separates the composite signal into its component signals, which is possible due to the component signals being orthogonal. The output from the radar signal decoder 302 is used to synthesize one or more beams in step S307, using the beamformer 303, from which the target azimuth and signal elevation (both relative to the radar transmitting system 201) can be determined. In step S307, which may be performed multiple times simultaneously or consecutively to synthesize multiple beams, the weights are adjusted to scan for targets and modes to find the optimum mode or combination of modes for a particular target. In particular, in S307, each of the component signals may be multiplied by different amplitude weights and have different phase shifts added so as to synthesize beams. Performing one instance of step S307 synthesizes one beam. Performing multiple instances of step S307 synthesizes multiple beams, which can speed up the scan process. If there is one target and one ionospheric mode, the beam with the highest signal amplitude will localize where the signal bounces from the ionosphere (in elevation and azimuth). If there are multiple modes, it is possible that the mode with the highest amplitude will be selected by the radar processor.

In step S308, the optimum (i.e. best) mode or combination of modes is chosen. In steps S309a and S309b, the radar range of the targets corresponding to each mode or modes, and the measured Doppler shift of the targets corresponding to each mode or modes are determined. In step S310a, coordinate registration is performed i.e. the radar ranges are converted into ground ranges. In step 310b, the Doppler impact of the large TIDs are subtracted from the measured Doppler shift values to give the true line of sight Doppler shift and velocity of the target. In order to perform steps S310a and S310b, the radar receiving system 102 uses an output 311 of the real time ionospheric model 109 to convert radar ranges to ground ranges and an output 312 of the TID imager 112 to subtract the impact of TIDs on the target signal. Both outputs 311 and 312 are communicated to the radar receiving system 102 via the controller communications system 105b and receiver communications system 105c.

The radar receiving system 102 outputs the ground ranges 314 of the target and the line of sight Doppler shift and speed values 315 of the target.

The display 305 at each of the individual radar receiving systems 102 can be used to show the ground ranges 314 and the LOS speed values 315 based on the information obtained from that particular radar receiving system 102. The single receiver target tracker 306 can be used to track a target based on the data from that particular radar receiving system 102 to which the single receiver target tracker 306 belongs.

Figure 4:
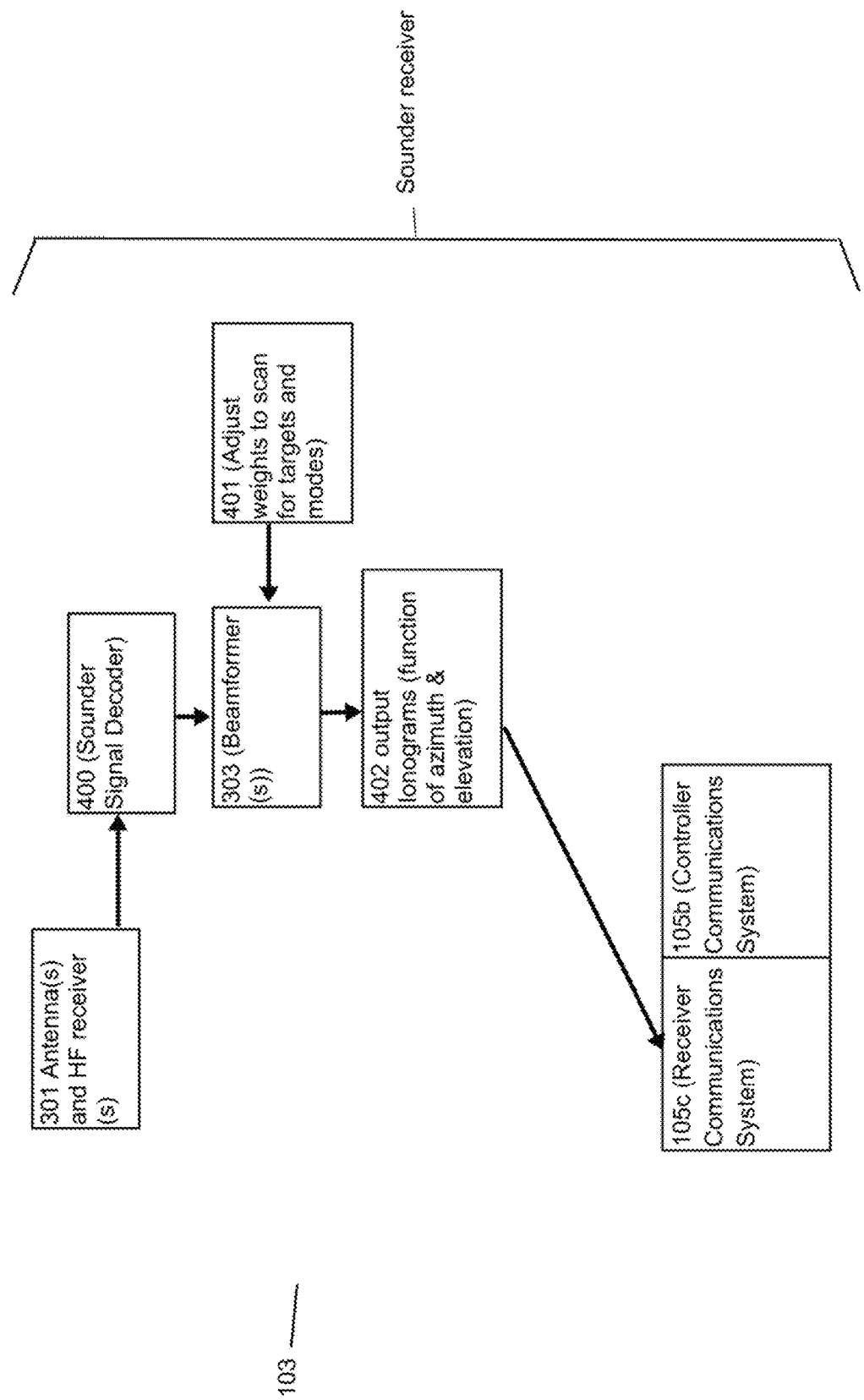
FIG. 4 shows a representation of a sounder receiving system according to an embodiment of the invention.

FIG. 4 shows a representation of a sounder receiving system 103 according to an embodiment of the invention and which can be used in the NOTHR receiving system as part of the system of FIG. 1. The sounder receiving system 103 may receive signals emitted by a sounder transmitting system 113. Both the sounder receiving system 103 and the sounder transmitting system 113 can use the aforementioned infrastructure or can use standalone equipment. In this embodiment it is assumed that the antennas, transmitter, and receivers are common between the radar and sounder transmitting systems 201, 113, and radar and sounder receiving systems 102, 103 respectively, but that different waveforms are used. The sounder receiving system 103 may comprise a sounder signal decoder 400 (or it may use the radar signal decoder 301 as described above). As described above in relation to the radar receiving system 102, the antenna(s) 301 receive a signal, in this case from the sounder transmitting system 112, which is input into the beamformer 303, where the amplitude weights and phases are adjusted 401. These data are used to produce and output 402 an ionogram which describes the propagation of the ionospheric signals as a function of signal delay and frequency parameterized by amplitude, azimuth and elevation. The output ionogram is communicated to the NOTHR controller 104 via the receiver communications system 105c and the controller communications system 105b.

The output from each sounder receiver system 103 is an oblique ionogram that describes the ionospheric characteristics between the radar transmitting system 201 and one of the radar receiving systems 102, or a back-, forward- or side-scatter ionogram that describes the ionospheric characteristics from the radar transmitting system 201 to an area of ground scatter and thence to the radar receiving system 102. A standalone vertical ionosonde may also be incorporated at each NOTHR receiving system 107. Data from each sounder receiving system 103 (and optionally from any standalone vertical ionosondes if present) is passed through the NOTHR communication system (e.g. via the receiver communications system 105c and the controller communications system 105b) to the NOTHR controller 104 where it is assimilated with other ionospheric data to form the (self-consistent) ionospheric model 109. This model 109 provides the means to convert radar range to ground range (e.g. with coordinate registration using the coordinate registration (CR) system 110), correct for TIDs using the TID imager 112, and functions as the primary input to the frequency management system (FMS) 111. Decisions by the FMS 111 are in turn sent to the radar transmitting and radar receiving systems 201, 102 to close the loop for the next surveillance cycle (e.g. the frequency of the transmission may be changed in the next surveillance cycle). In this context, the surveillance cycle may refer to, for example, one sweep of a periodically sweeping beam over a target area, or directing a beam to a new target area.

Figure 5:
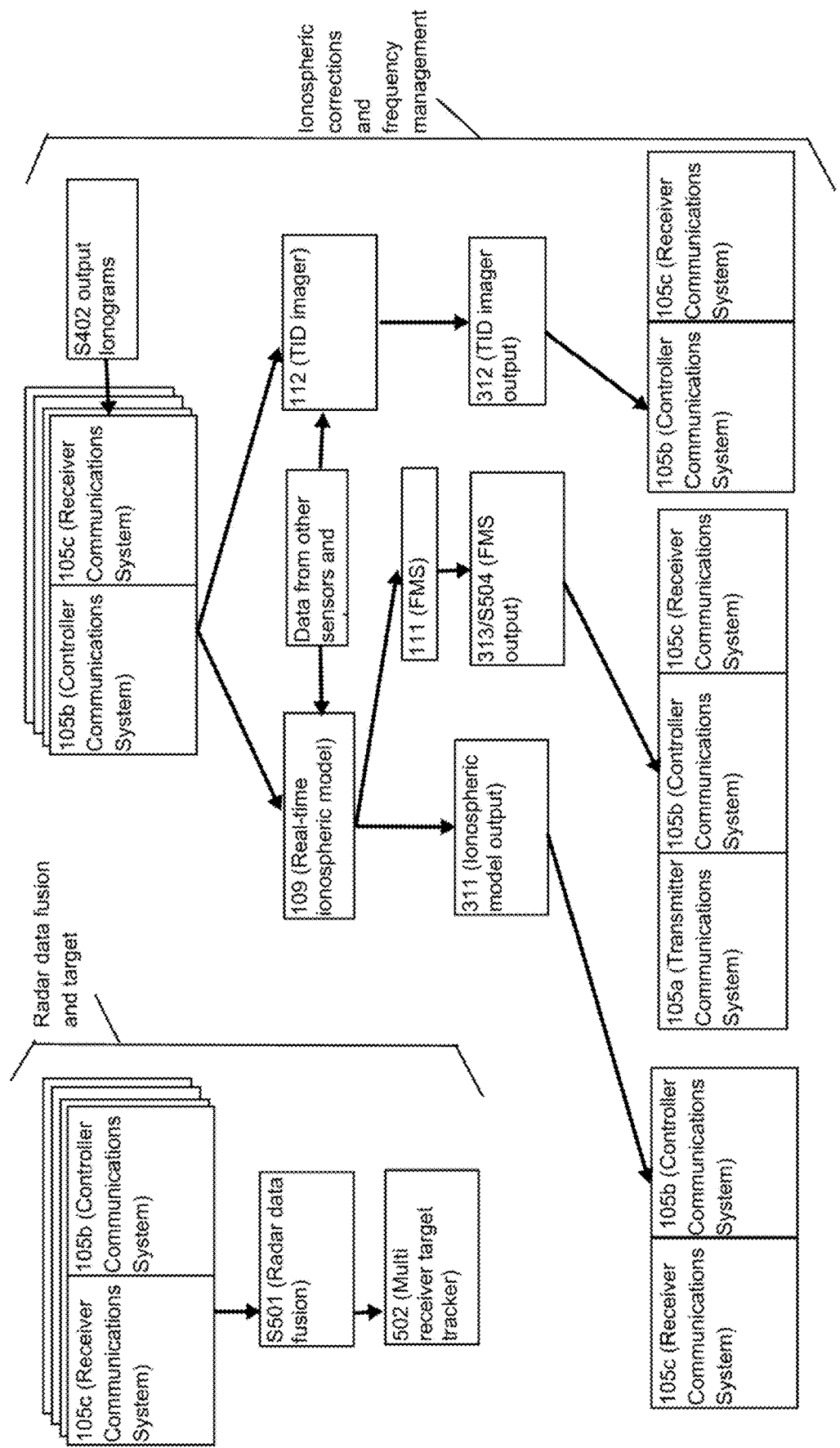
FIG. 5 shows a representation of a controller according to an embodiment of the invention.

FIG. 5 shows an illustrative representation of a number of components of a NOTHR controller 104 according to an embodiment of the invention and which can be used as part of the system of FIG. 1. Not all the components are shown, for example, it will be understood that one or more processors, memory, and other known hardware components required to perform signal processing may also be present. Each of the radar receiving systems 102 will have output target ground ranges 314 and output target LOS Doppler shifts and speeds 315 which are communicated to the NOTHR controller 104 via the receiver communications system 105c and the controller communications system 105b. Some or all of the measured and calculated intermediate data used to produce the output ground ranges 314 and Doppler shifts and speeds 315 may also be communicated to the NOTHR controller 104. The ground ranges 314, Doppler shifts and speeds 314, and any measured and calculated intermediate data are hereinafter together referred to as radar measurements.

The radar measurements from each radar receiving system 102 are fused (i.e. combined) S501 in a multi receiver target tracker 502 to render the position and velocity of the target.

Similarly, the ionogram outputs (and any required measured and/or calculated data used to obtain them) from each of the sounder receiving systems 103 are assimilated into the ionospheric model 109 together with data from other sensors independent of the NOTHR facilities and geo-referenced terrain data from the radar.

The ionospheric model output 311 is used S310a by the receiver coordinate registration system 110 via the controller communications system 105b, and the receiver communications systems 105c.

The ionospheric model 109 is used by the FMS 111 to determine and communicate suitable FMS frequency instructions via the controller communications system 105b, and the transmitter and receiver communications systems 105a, 105c to the radar transmitting system 201, and the radar receiving system 102, 103. The FMS frequency instructions might be to, for example, increase or decrease frequency as a result of changes in environmental conditions to ensure the system retains a desired degree of performance.

Further, as described in relation to FIG. 3, the TID imager output 312 are communicated by the NOTHR controller 104 to the radar receiving systems 102.

The operation and a number of advantages provided by the above described embodiments will now be explained below in relation to FIG. 6.

The NOTHR system 108 consists of one (or more) transmitting station(s) or facility(ies) 601 having the above described radar transmitting system 201 and a number of receiving stations 602a-e each having one of the radar receiving systems 102 and radar sounding systems 103, and each consisting of just a few (such as one, two or three) receiving antenna. The transmitting station may be said to comprise a transmitter comprising a transmitter antenna array, wherein the signals on each array element are mutually orthogonal. Each receiving station of the plurality of receiving stations may be said to comprise a receiver comprising a small receiver antenna array with a small ground footprint (the term small is used relative to the receiver antenna array size and ground footprint in conventional OTHR systems), and the receiver is configured to receive and to distinguish said orthogonal signals. As described above, each of the receiving stations may also be said to use the orthogonal signals to synthesize beams and, in combination with a real-time ionospheric model, estimate the position and speed of the target. FIG. 6 shows only five receiving stations 602a-e but the number used will depend on the desired system performance and desired number of backup receiving stations to achieve a desired degree of receiver system redundancy. As described above, the signal from the transmitting station 601 is reflected off the ionosphere 603 to provide the over-the-horizon capabilities of the system to detect a target 604 situated over the horizon. The aim is to detect and track a target using at least two receiver stations. Because of propagation limitations it is likely that not all receiving stations will be able to receive the signals with a particular transmitter-target geometry. In the example shown in FIG. 6, receiving station 602e is not able to receive signals due to the transmitter-target geometry.

The inventors have recognized that a networked approach with many (potentially numerous) radar receiving systems 102 is made practical by the use of adaptive, non-causal beamforming on transmit, such as that described in Frazer et al. 2009, where the transmit beams are formed at the receiver after the signal has been radiated by the transmitter. In particular, with the approach of Frazer et al. 2009, both transmit and receive beamforming is applied post-signal reception at the receiver. This invention recognizes that by applying the techniques of adaptive, non-causal beamforming on transmit such as that described in Frazer et al. 2009, the receiving antenna array at each of the receiving stations 602a-e can be reduced in size to just a few elements and in the limit to a single antenna. By so doing, the amount of land required for the receiving antenna at each of the receiving stations 602a-e is reduced significantly and this facilitates relocatable and mobile (vehicle and ship) receiving system deployment. It also makes the cost of receiving stations significantly cheaper than traditional OTHR receiving stations.

The invention envisages many small, cheap radar receiving systems 102 networked together through a communication system, for example, comprising the transmitter communications system 105a, the controller communications system 105b, and the receiver communications system 105c. Each receiving station will have its own communications equipment to facilitate the networking together of all of the radar receiving systems 102. One of the receiving stations 602a may be located close to the radar transmitting system 201 in accordance with a conventional OTHR configuration. The others 602b-e will be spaced apart from the transmitting station 601 at distances which are greater than the typical 50 km to 100 km transmitter-receiver separation of conventional OTHR systems. The latter would result in the NOTHR system 108 being treated as a bistatic or multistatic system because the separation distance is a significant fraction of or comparable to the target ground range. In other words, the receiving stations may be said to be geographically dispersed so as to provide a plurality of measurement angles at the radar target. Through the multistatic approach implicit in the invention, the NOTHR system 108 renders detectable those targets that are moving close to tangentially with respect to a conventional monostatic OTHR and which are, therefore, hidden in or close to the zero Doppler line. Given an appropriate disposition of the radar receiving systems 102 relative to the target, the NOTHR system 108 will also be able to estimate the target velocity (and its position) using the bistatic measurements from at least two of the radar receiving systems 102. More generally, combining the target signals from the radar receiving systems 102 will improve the signal to noise plus clutter ratios of low cross section targets such as ships and, thereby improve the discrimination of the targets.

As described above, the NOTHR system 108 employs 2D transmitter arrays to ionospheric and ground clutter by providing options to filter out (or weight out) unwanted ionospheric modes with which the clutter may be associated, as described in Frazer et al., 2014. This will improve the detection and tracking of ships which move slowly and which can present a low radar cross section.

The NOTHR system 108 relies on knowledge of the ionosphere, provided by the ionospheric model 109 (which must be a close to a real-time ionospheric specification). As described above in relation to FIGS. 4 and 5, this knowledge is used to convert the measured radar-range to a corresponding ground-range in a process known as coordinate registration (CR). The NOTHR system 108 relies on optimally combining many different types of ionospheric sensor data, through a process of assimilation, into a background model of the ionosphere, using techniques such as those described in Elvidge and Angling, 2019. The NOTHR concept with multiple receiving systems makes possible updating of the ionospheric model 109 using data from multiple scatter, oblique and vertical sounder paths, together with geo-referenced terrain data from the radar. By this means the ionospheric model will have a higher fidelity than in conventional OTHR. In addition, these ionospheric sensor data can be supplemented by data from ionospheric sensors independent of the NOTHR facilities.

The ionospheric model 109 can also be an important element of the frequency management system (FMS) that will control the radar operating frequency such that the radar transmitting system 201 at the transmitting station 601 both illuminates the target 604 and the target scattered signal travels to the receiving stations 602*a-e*. For the monostatic configuration this is a well understood problem. For the NOTHR configuration, the operating frequency band which can be used will be restricted to those that can accommodate the differing path lengths and bearings. Thus, the NOTHR FMS will need to optimize the frequency choice to not only illuminate the target, but also to ensure that an optimum set of radar receiving systems 102 receives the radar signals. Determining the optimum set of operating parameters can be achieved by minimizing an appropriate cost function e.g. an optimum frequency cost function. The optimum frequency cost function should seek to find frequencies which propagate from the transmitting station 601 to the target 604 and then to as many receiving stations 602*a-e* as possible and should also seek out a diverse set of aspect angles to both maximize the target radar cross section) and improve the target velocity estimates. At certain times it may not be possible to find a frequency where the signal propagates to more than one receiving system. Under these circumstances multiple looks of the target, at a number of frequencies, will be needed.

Networked measurements of the ionosphere over and beyond the radar surveillance region facilitates the imaging of the TIDs that introduce errors in the target velocity estimates. TID induced errors are small in comparison with aircraft and missile speeds but are important in the context of ship target detection and tracking. The NOTHR system 108 incorporates technology and algorithms to calculate the TID velocities and negate their impact when calculating ship target velocities.

The NOTHR system 108 can be applied to OTH-OTH paths (transmitter to target by OTH and return from target to receiver by OTH) and to OTH-LOS (transmitter to target by OTH and return from target to receiver by LOS) paths.

The NOTHR system 108 as described above differs from conventional OTHR radar in at least the following ways:

1: OTHR conventionally uses large transmitter antenna arrays and often even larger receiver antenna arrays, sometimes extending to many kilometres. The transmitting and receiving systems are usually located 50 km to 100 km from each other and although formally bistatic, the systems may often be considered monostatic at typical measurement ranges (1000s of km). The NOTHR system 108 allows the receiving antenna array to be reduced in size to just a few elements and, in the limit, to a single antenna. Therefore, the NOTHR system 108 provides the benefit that it reduces the amount of land required for the receiving antenna and facilitates the use of mobile (vehicle and ship) receiving systems. The receiving systems are thus also cheaper than conventional OTHR systems.

2: A conventional pseudo monostatic OTHR is unable to measure the velocity vector of a target, and can only its radial speed with respect to the OTHR. In addition, if the incidence angle of the signal at the target is close to tangential to its direction of travel (i.e. the measurable component of velocity), the target will be hidden in the radar clutter. Moreover, in a conventional OTHR common types of targets may have a small radar cross section in the measured direction (e.g., an aircraft flying radially away from the radar).

That there is typically only one radar illuminating a designated region in OTHR systems is a consequence of the system cost and the requirements for large areas of land on which to install the antenna arrays. This invention provides the benefit that, as a consequence of the radar receiving systems 102 being small and cheap, many can be easily deployed, and when networked together they can measure the speed at many angles to provide a better estimate of the target velocity.

3. OTHR conventionally uses backscatter and vertical soundings of the ionosphere to convert radar range to ground range—coordinate registration (CR). Conventional OTHR do not generally use oblique forward ionograms, nor forward scatter or side scatter for this purpose. As described above, the soundings are also used to optimally choose the radar operating frequency—a process known as Frequency Management (FM). The NOTHR system 108 provides the benefit that, because the radar receiving systems 102 are small and cheap and networked together, numerous measurements of the ionosphere across a wide area can be made. These can be optimally combined (using data assimilation or other techniques such as tomography) independently or with other data, including geo-referenced terrain features, to improve the target geolocation and frequency management in a manner not used by conventional OTHR systems. The better the ionospheric model used, the better and more accurate the coordinate registration and frequency management will be. Thus, the ionospheric model of a NOTHR system 108, which uses assimilated ionospheric sounding data from more than one and/or advantageously all of the receiving stations, will provide a more accurate output than an ionospheric model used by conventional OTHR systems which does not have access to as much sounding data. Measurements of the ionosphere over and beyond the surveillance region as described herein also provide a means to image travelling ionospheric disturbances (TIDs) which can obscure slow moving targets if they are not corrected for.

4: OTHR conventionally uses 1-D receiver antenna arrays. On the rare occasions where 2D arrays have been employed to provide signal elevation angle of arrival information, it has been performed in isolation and without the other features of the NOTHR system 108. By using a 2D transmitter antenna array, coordinate registration (CR) can be improved, because mode identification is possible, and ionospheric and ground clutter in the radar signal can be minimized by filtering out unwanted modes. This assists the NOTHR system 108 in detecting and tracking ships which move slowly and which can present a low radar cross section. The reduction in clutter makes possible the detection of low visibility slow moving targets heretofore obscured by the clutter.

Whilst each of the distinct advantages 1), 2), 3) and 4) described above can independently enhance OTHR, none alone provides the capability to reliably detect slow moving, potentially also physically small, ships. The inventors have appreciated that a system which combines them all provides the capability to reliably detect slow moving (and sometimes physically small) ships and to simultaneously facilitate doing so from mobile platforms. In other words, the NOTHR system 108 provides an OTHR capable of detecting ships which uses multiple small and cheap receiving systems which are truly mobile and relocatable by combining a plurality of networked receivers which use adaptive, non-causal beamforming on transmit, 2D antenna arrays at the transmitter, and real-time ionospheric data assimilation of ionospheric sensing data from a large number of receivers and instruments which are spaced out over a wide area.

As described above, these advantages may be said to be realized by a system and/or method which may comprise a controller, a transmitting station, and a plurality of receiving stations. The real-time ionospheric model may be provided in the controller but may also be provided elsewhere in the NOTHR system. The controller may be configured to communicate an ionospheric model output, frequency management instructions and travelling ionospheric images to the plurality of receiving stations, and frequency management instructions to the transmitting system. The transmitting station may comprise a transmitter comprising a transmitter antenna array, wherein the signals on each array element are mutually orthogonal. Each of the receiving stations may comprise a receiver comprising a receiver antenna array and the receiver may be configured to receive said signals. Each of the receiving stations may comprise a receiver and a small antenna array with a small ground footprint and the receiver may be configured to receive and to distinguish said orthogonal signals. Each of the receiving stations may be configured to use the orthogonal signals to synthesize beams and, in combination with the real-time ionospheric model, estimate the position and speed of the target, which can be combined by the controller to estimate the velocity of the target.

It will be appreciated by the person skilled in the art that various modifications may be made to the above described embodiment without departing from the scope of the present invention. For example, as described above, the receiving stations may be configured to obtain an analysis output (for example comprising an estimated position and speed) using the received signals and ionospheric model output and to send that analysis output to the controller, said analysis output having been obtained using computing power available at the receiving stations. Alternatively, some or all of the receiving stations may be configured to send an analysis output comprising raw data (or data which has undergone only limited processing) to the controller. The controller would then proceed to combine the received analysis outputs to estimate the position and speed of the target (when one receiving station is considered) and/or velocity of the target (when outputs from multiple receiving stations are combined). An advantage provided by this system and technique is that the computing power required to perform the process and combine the data may be concentrated at one facility housing the controller, further enabling each of the receiving stations to be small, cheap, and mobile. This approach may also be taken further by giving the controller access to cloud based computing power and data storage, enabling scaling up and scaling down of the system based on the data volume and processing resources required at any given time.

In another example, as described above, the ionospheric sounding may be performed by sharing the receivers and transmitters of the NOTHR system. Alternatively, a separate ionospheric sounder transmitting system distinct from the transmitter of the transmitting station, and/or a plurality of ionospheric sounder receiving systems distinct from the receivers of the receiving stations may be used to obtain the ionospheric sounding data associated with the receiving stations.

Each feature disclosed or illustrated in the present specification may be incorporated in the invention, whether alone or in any appropriate combination with any other feature disclosed or illustrated herein.

The invention may be described by reference to the following numbered clauses:

Clause 1. A over-the-horizon radar (OTHR) system comprising:

a controller;
a transmitting station; and
a plurality of receiving stations,
wherein said controller comprises an ionospheric model configured to generate an ionospheric model output, and wherein said controller is configured to communicate frequency management instructions and said ionospheric model output to said plurality of receiving stations, and said frequency management instructions to said transmitting station;
wherein said transmitting station comprises a transmitter comprising a transmitter antenna array having mutually orthogonal antenna array elements and wherein the transmitter is configured to transmit mutually orthogonal signals according to said frequency management instructions to illuminate a target, said signals reflecting off the ionosphere, and off the target;
wherein each of said receiving stations comprises a receiver comprising a receiver antenna array and the receiver is configured to receive said signals,
wherein each of said receiving stations is configured to use said signals and the ionospheric model output to obtain an analysis output, and to communicate said analysis output to the controller; and
wherein the controller is configured to combine each of said analysis outputs to estimate a position and a velocity of the target.

Clause 2. An OTHR system according to clause 1, wherein said OTHR system is configured to perform beamforming at said receiving stations after the receivers have received said signals.

Clause 3. An OTHR system according to any preceding clause, wherein said OTHR system is provided as a multi-static system.

Clause 4. An OTHR system according to any preceding clause, wherein said transmitter antenna array is a two dimensional (2D) antenna array.

Clause 5. An OTHR system according to any preceding clause, wherein said signals are sequentially reflected off the ionosphere, off the target, and off the ionosphere.

Clause 6. An OTHR system according to any preceding clause, wherein at least a first of said plurality of receiving stations is positioned at a distance of greater than 100 km from said transmitting station.

Clause 7. An OTHR system according to clause 6 wherein at least a second of said plurality of receiving stations is positioned at a distance of less than 100 km from said transmitting station.

Clause 8. An OTHR system according to any preceding clause, wherein each said receiver antenna array comprises between one and ten antenna elements.

Clause 9. An OTHR system according to any preceding clause, wherein each receiving station comprises only one receiver antenna array.

Clause 10. An OTHR system according to any preceding clause, comprising a communications system configured to facilitate communications between the controller, the transmitting station and each of the plurality of receiving stations, and
wherein said communications system is configured to communicate ionospheric sounding data associated with each of said plurality of receiving stations from each of said plurality of receiving stations to said controller.

Clause 11. An OTHR system according to any preceding clause, wherein in obtaining said analysis output, each of said receiving stations is configured to perform coordinate registration and Doppler shift analysis.

Clause 12. An OTHR system according to clause 11, wherein as part of performing said coordinate registration and Doppler shift analysis each of said receiving stations is configured to calculate a radar range associated with the target and determine a Doppler shift associated with the target, and to convert said radar range to a ground range of the target and said Doppler shift to a speed of the target.

Clause 13. An OTHR system according to clause 12, wherein said ionospheric model output comprises a travelling ionospheric disturbance image; and wherein said receiving station is configured to remove an impact that said travelling ionospheric disturbance has on said Doppler shift.

Clause 14. An OTHR system according to any preceding clause, wherein said transmitter of said transmitting station is configured to transmit ionospheric sounding signals and said receivers of said plurality of receiving stations are configured to receive said ionospheric sounding signals to produce said ionospheric sounding data.

Clause 15. An OTHR system according to any preceding clause, comprising an ionospheric sounder transmitting system distinct from said transmitter of said transmitting station, and/or a plurality of ionospheric sounder receiving systems distinct from said receivers of said plurality of receiving stations, wherein said ionospheric sounder transmitting system is configured to transmit said ionospheric sounding signals, and/or one or more of said plurality of said ionospheric sounder receiving systems is configured to receive said ionospheric sounding signals so as to obtain said ionospheric sounding data.

Clause 16. A method of detecting the position and velocity of a target positioned beyond the horizon, said method comprising:

with an ionospheric model generating an ionospheric model output;

communicating frequency management instructions and said ionospheric model output to a plurality of receiving stations;

communicating said frequency management instructions to a transmitting station, said transmitting station comprising a transmitter having a transmitter antenna array having mutually orthogonal antenna array elements;

transmitting from said transmitting station mutually orthogonal signals according to said frequency management instructions to illuminate a target having a position and velocity, said signals reflecting off the ionosphere and off the target;

receiving at each of said plurality of receiving stations with a receiver comprising a receiver antenna array said signals;

at each of said plurality of receiving stations using said ionospheric model output to obtain an analysis output;

communicating each of said analysis outputs to a controller; and combining each of said analysis outputs to estimate a position and a velocity of the target.

Clause 17. A method according to clause 16, comprising performing beamforming at said receiving stations after the receivers have received said signals.

Clause 18. A method according to clauses 16 or 17, wherein said method is performed as a multistatic method.

Clause 19. A method according to clauses 16 to 18, wherein said transmitter antenna array is a two dimensional (2D) antenna array.

Clause 20. A method according to clauses 16 to 19, wherein said signals are sequentially reflected off the ionosphere, off the target, and off the ionosphere.

Clause 21. A method according to clauses 16 to 20, wherein each said receiver antenna array comprises between one and ten antenna elements.

Clause 22. A method according to clauses 16 to 21, wherein each receiving station comprises only one receiver antenna array.

Clause 23. A method according to clauses 16 to 22, comprising communicating ionospheric sounding data from each of said plurality of receiving stations to said controller.

What is claimed is:

1. A method for implementing a relocatable Over-The-Horizon-Radar (OTHR) comprising:
    transmitting mutually orthogonal signals on each of a plurality of antenna elements of a transmitting system,
    receiving and decoding the orthogonal signals at a plurality of receiving systems to synthesize beams from the orthogonal signals, each receiving system having a plurality of antenna elements fewer in number than the plurality of antenna elements of said transmitting system,
    determining a target elevation and azimuth relative to the transmitting system from the synthesized beams, and
    connecting as a network the transmitting system, the plurality of receiving systems, and a network controller,
    wherein said transmitting comprises determining one or more transmit frequencies for the mutually orthogonal signals by minimizing an optimum frequency cost function to identify which one or more transmit frequencies cause the mutually orthogonal signals to propagate to a target and to a maximal number of said receiving systems, and
    wherein the plurality of antenna elements of each receiving system comprises between one and ten antenna elements; and
    wherein one or more of the plurality of receiving systems is a mobile, land-based receiving system.

2. The method, according to claim 1, wherein one or more of the plurality of receiving systems is redundant, and the method comprises:
    determining a velocity of the target with said networked plurality of receiving systems.

3. The method, according to claim 1, wherein the transmitting system comprises a two-dimensional (2D) transmitting array configured to identify ionospheric modes, and the method comprises:
    obtaining from the networked plurality of receiving systems bistatic, scatter and direct path sounding data from across the surveillance region, to generate substantially real-time ionospheric sounding data;
    assimilating the substantially real-time ionospheric sounding data and georeferenced radar data into a background ionospheric model to generate a substantially real-time ionospheric model; and
    performing coordinate registration and frequency management using the substantially real-time ionospheric model.

4. The method, according to claim 3, comprising:
    measuring and characterizing travelling ionospheric disturbances using said bistatic, scatter and direct path sounding data obtained from the networked plurality of receiving systems, and from said substantially real-time ionospheric sounding data and said geo referenced radar data.

5. The method, according to claim 4, wherein a target is a ship, and the method comprises:
   detecting and tracking said ship by:
   measuring a speed of said ship in a plurality of radar look directions;
   compensating for the impact of said travelling ionospheric disturbances; and
   filtering ionospheric and ground clutter in said signals using the 2D transmitting array.

6. The method, according to claim 1, wherein one or more of the plurality of receiving systems is relocatable and/or vehicle and ship deployable.

7. A relocatable over-the-horizon-radar (OTHR) system comprising:
   a transmitting system having an antenna comprising a plurality of antenna elements;
   a plurality of receiving systems each having a plurality of antenna elements fewer in number than the plurality of antenna elements of said transmitting system;
   a network controller; and
   a frequency management system;
   wherein the transmitting system is configured to transmit mutually orthogonal signals on each antenna element,
   wherein the frequency management system is configured to determine one or more transmit frequencies for the mutually orthogonal signals by minimizing an optimum frequency cost function to identify which one or more transmit frequencies cause the mutually orthogonal signals to propagate to a target and to a maximal number of said receiving systems;
   wherein the plurality of receiving systems is configured to decode the orthogonal signals to synthesize beams and to determine a target elevation and azimuth relative to the transmitting system from the synthesized beams, and
   wherein the transmitting system, the plurality of receiving systems and the network controller are networked together,
   wherein the plurality of antenna elements of each receiving system comprises between one and ten antenna elements; and
   wherein one or more of the plurality of receiving systems is a mobile, land-based receiving system.

8. The OTHR system according to claim 7,
   wherein one or more of the plurality of receiving systems is redundant; and
   wherein the networked plurality of receiving systems is configured to determine a velocity of the target.

9. The OTHR system according to claim 7, wherein the transmitting system comprises a two-dimensional (2D) transmitting array configured to identify ionospheric modes;
   wherein the networked plurality of receiving systems is configured to obtain bistatic, scatter and direct path sounding data from across a surveillance region to generate substantially real-time ionospheric sounding data;
   wherein the system is configured to assimilate the substantially real-time ionospheric sounding data into a background ionospheric model to generate a substantially real-time ionospheric model; and
   wherein the system is configured to perform coordinate registration and frequency management using the substantially real-time ionospheric model.

10. The OTHR system according to claim 9,
    wherein the OTHR system is configured to measure and characterize travelling ionospheric disturbances using said bistatic, scatter and direct path sounding data obtained from the networked plurality of receiving systems, and from said substantially real-time ionospheric sounding data and said geo-referenced data.

11. The OTHR system according to claim 10,
    wherein a target is a ship, and the OTHR system is configured to:
    detect and track said ship by:
    measuring a speed of said ship in a plurality of radar look directions;
    compensating for the impact of said travelling ionospheric disturbances; and
    filtering ionospheric and ground clutter in said signals using the 2D transmitting array.

12. The OTHR system according to claim 7, wherein one or more of the plurality of receiving systems is relocatable and/or vehicle and ship deployable.

13. A network of relocatable OTHR systems comprising a plurality of the relocatable OTHR systems of claim 7.

* * * * *